US009682470B2

(12) United States Patent
Helm

(10) Patent No.: US 9,682,470 B2
(45) Date of Patent: Jun. 20, 2017

(54) MODULAR WORKBENCH AND POWER TOOL SUPPORT

(71) Applicant: Donald Helm, Greenville, MO (US)

(72) Inventor: Donald Helm, Greenville, MO (US)

( * ) Notice: Subject to any disclaimer, the term of this patent is extended or adjusted under 35 U.S.C. 154(b) by 609 days.

(21) Appl. No.: 13/873,278

(22) Filed: Apr. 30, 2013

(65) Prior Publication Data

US 2013/0285302 A1 Oct. 31, 2013

Related U.S. Application Data

(60) Provisional application No. 61/640,415, filed on Apr. 30, 2012.

(51) Int. Cl.
*B23Q 3/00* (2006.01)
*B25H 1/04* (2006.01)
*B25H 1/14* (2006.01)

(52) U.S. Cl.
CPC ................ *B25H 1/04* (2013.01); *B25H 1/14* (2013.01)

(58) Field of Classification Search
USPC .......................... 269/16, 17; 144/285, 286.1
See application file for complete search history.

(56) References Cited

U.S. PATENT DOCUMENTS

| | | | |
|---|---|---|---|
| 2,767,747 A | 10/1956 | Burrows | |
| 4,483,573 A * | 11/1984 | Keller | 312/281 |
| D357,140 S * | 4/1995 | Hollinger | D6/684 |
| 6,209,597 B1 | 4/2001 | Calcote | |
| 6,520,227 B2 * | 2/2003 | Mc Farlin et al. | 144/371 |
| 7,077,179 B1 * | 7/2006 | Camiano et al. | 144/286.1 |
| 7,086,434 B2 * | 8/2006 | Lee | B23D 47/025 144/286.1 |
| 7,159,629 B1 * | 1/2007 | Rowe | 144/285 |
| 7,752,951 B2 | 7/2010 | Ouellette | |
| 7,891,277 B2 * | 2/2011 | Ouellette | 83/477.2 |
| 2011/0079127 A1 | 4/2011 | Somogyi et al. | |

* cited by examiner

*Primary Examiner* — Joseph J Hail
*Assistant Examiner* — Shantese McDonald
(74) *Attorney, Agent, or Firm* — Global Intellectual Property Agency, LLC; Daniel Boudwin

(57) ABSTRACT

A modular workbench device is provided having an elongated work surface comprising a first and second side surface situated on either side of a central surface, the surfaces being supported in an elevated position by a workbench frame. The central surface includes an upper and lower side and a hingable connection to the workbench frame, wherein the surface can be rotated upwards to reveal its lower side. The upper side of the central surface provides a clean work area for a user to engage work pieces thereupon. The lower side of the central work surface provides a power tool mounting frame that allows for connection to a power router tool or power circular saw tool for work piece cutting. The working end of the power tool extends through the central surface, while the mounting plate secures the base or shoe of the tool in a stable configuration during use.

11 Claims, 7 Drawing Sheets

MODULAR WORKBENCH AND POWER TOOL SUPPORT

CROSS REFERENCE TO RELATED APPLICATION

This application claims the benefit of U.S. Provisional Application No. 61/640,415 filed on Apr. 30, 2012, entitled “Miter Saw/Table Saw/Router Combo Stand.” The above identified patent application is herein incorporated by reference in its entirety to provide continuity of disclosure.

BACKGROUND OF THE INVENTION

Field of the Invention

The present invention relates to tool and workbenches. More specifically, the present invention pertains to a workbench that is convertible into a table saw or routing table.

When working with various tools during a construction project or home renovation, workers require adequate space for proper use of tools and for making accurate measurements or cuts. A cluttered work environment is both a hamper on efficiency and a potential hazard for the worker. Without significant space, a user may make haphazard cuts through material, improper measurements, or utilize tool use techniques that are not particularly safe.

Common household tools for construction or renovation projects include saws and cutting tools. These devices are operated either by hand or are supported by a tool bench for feeding a material theretowards for the purposes of cutting the material into lengths. Some tool operations are best approached using a handheld power tool such as a drill or a circular saw, while still others are best approached using a stationary tool bench wherein the tool remains stationary while its work piece is moved thereto. Examples of stationary power tools include table saws, miter saws, and routers.

A workbench is an important tool for most construction projects, as it provides an elevated platform upon which to operate power tools, make measurements, and to support work pieces being manipulated by the worker. Generally workbenches are limited to sheets of material placed over saw horses or to dedicated assemblies that serve a singular purpose. While providing a necessary functionality, these structures can utilized to support other tools for the purposes of facilitating a project and for aiding a work operating on a work piece.

The present invention provides a combination workbench and power tool support means, wherein the device comprises an frame having extended supports for supporting a pivotable work surface in an elevated position. The work surface is pivotable from its connection to the frame and is clamped thereto when in a working state. Along the work surface is a power tool support plate that allows for attachment of a standard circular saw or router tool to the underside of the work surface, transforming the workbench into a power tool bench supporting the power tool in a working state. The device provides residential and commercial users to operate a power tool therefrom or utilize the device as a simple workbench as desired.

Description of the Prior Art

Devices have been disclosed in the prior art that relate to convertible power tools and workbenches. These include devices that have been patented and published in patent application publications, and generally relate to various structures for the purposes of supporting a power tool or arranging the workbench for a particular task. The following is a list of devices deemed most relevant to the present disclosure, which are herein described for the purposes of highlighting and differentiating the unique aspects of the present invention, and further highlighting the drawbacks existing in the prior art.

Specifically, U.S. Pat. Nos. 7,891,277 and 7,752,951 to Ouellette disclose a convertible tool that transitions from a miter saw to a table saw as desired by the user. The device comprises a pivotable saw blade and motor commonly found in miter saws, wherein the saw blade and motor are pivotably connected to a base frame. A pivotable rear table is connected to the base frame and rotates over the miter saw, receiving the unsheathed miter saw blade through a slot in the table to convert the miter saw into a table saw when the table is in a horizontal position thereover. While providing a convertible table that transitions from a miter to a table saw, the Ouellette device does not describe a workbench having a power tool attachment to form either a flat workbench or saw table as desired by the user.

Another such device is U.S. Pat. No. 2,767,747 to Burrows, which discloses a conversion kit for a portable saw that allows an otherwise handheld circular saw to be attached to a workbench for use as a stationary table saw. The kit comprises a set of brackets that allow the circular saw to be attached to a workbench having a penetration through its work surface, whereby the brackets prevent movement of the circular saw and maintain its position while in use as a table saw. The Burrows device is limited to an attachment kit for an existing circular saw rather than a workbench convertible into a tool support.

U.S. Pat. No. 6,209,597 to Calcote discloses a power tool mounting frame for operatively positioning a power tool thereon, comprising a frame having a top for securing a power tool therethrough. The top is mounted to the frame through a series of slots that allow the frame top and thus the attached tool to be oriented in a number of different arrangements for the user. While the Calcote device relates to tool supports and workbenches, the device is for orienting a power tool attached to the workbench in a number of orientations to suit the given task.

Finally, U.S. Patent Publication No. 2011/0079127 to Somogyi discloses a circular saw conversion table that facilitates the conversion of a commercial portable circular saw into a table saw. A plurality of clamps along the bottom surface holds the portable circular saw and table together, wherein the table is collapsible for easy storage and transport. A mounting plate with removably mounted clamping bars secures the circular saw to the table and places the saw blade through the table for use as a table saw.

The present invention provides a modular workbench that allows for an open workspace for workers and also a power tool support for various cutting operations, wherein the device can readily accept a circular saw or router power tool to transform the workbench into a cutting tool. It is submitted that the present invention is substantially divergent in design elements from the prior art, and consequently it is clear that there is a need in the art for an improvement to existing workbench devices. In this regard the instant invention substantially fulfills these needs.

SUMMARY OF THE INVENTION

In view of the foregoing disadvantages inherent in the known types of workbench devices now present in the prior art, the present invention provides a new modular and power tool receiving workbench that can be utilized for providing convenience for the user when offering a user a flat work area or a support for a power cutting tool.

It is therefore an object of the present invention to provide a new and improved workbench assembly that has all of the advantages of the prior art and none of the disadvantages.

It is another object of the present invention to provide a modular workbench assembly that first functions as a work surface to support work pieces for a user, wherein an elevated surface is provided for a construction project.

Another object of the present invention is to provide a modular workbench assembly that includes a hinged interior surface having an aperture and a tool frame thereon for mounting a power tool, where a power circular saw or router tool is supported from one side of the surface while the tool working end protrudes through the surface to perform cutting actions on the opposing side thereof.

Yet another object of the present invention is to provide a modular workbench assembly that can support a generic router tool, wherein the mounting frame includes a plurality of fastener locations for mounting the base of the router to the mounting frame of the workbench.

Another object of the present invention is to provide a modular workbench assembly that can support a circular saw power tool by way of a clamping structure that secures the base plate or shoe of the circular saw to the mounting plate in a static and stable configuration during operation.

A final object of the present invention is to provide a modular workbench assembly to support a user's activities during a project, wherein a clean working surface is provided, or alternatively a power tool support is provided for modular use using a single assembly.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
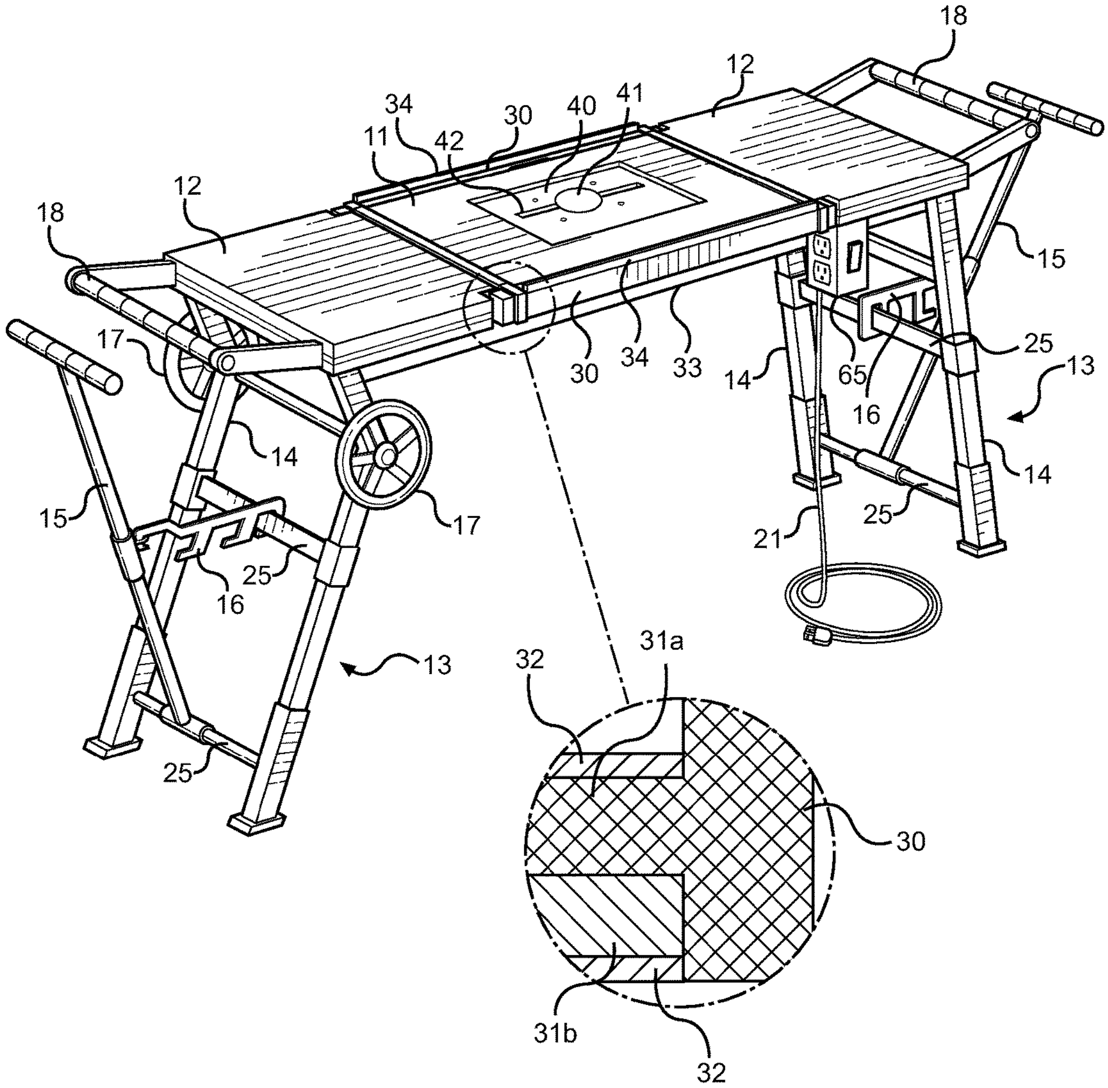
FIG. 1 shows a perspective view of the power tool workbench of the present invention.

Reference is made herein to the attached drawings. Like reference numerals are used throughout the drawings to depict like or similar elements of the modular workbench assembly. For the purposes of presenting a brief and clear description of the present invention, the preferred embodiment will be discussed as used for providing either a clean work surface for a user or a power tool support for use of the workbench as a cutting table. The figures are intended for representative purposes only and should not be considered to be limiting in any respect.

Figure 2:
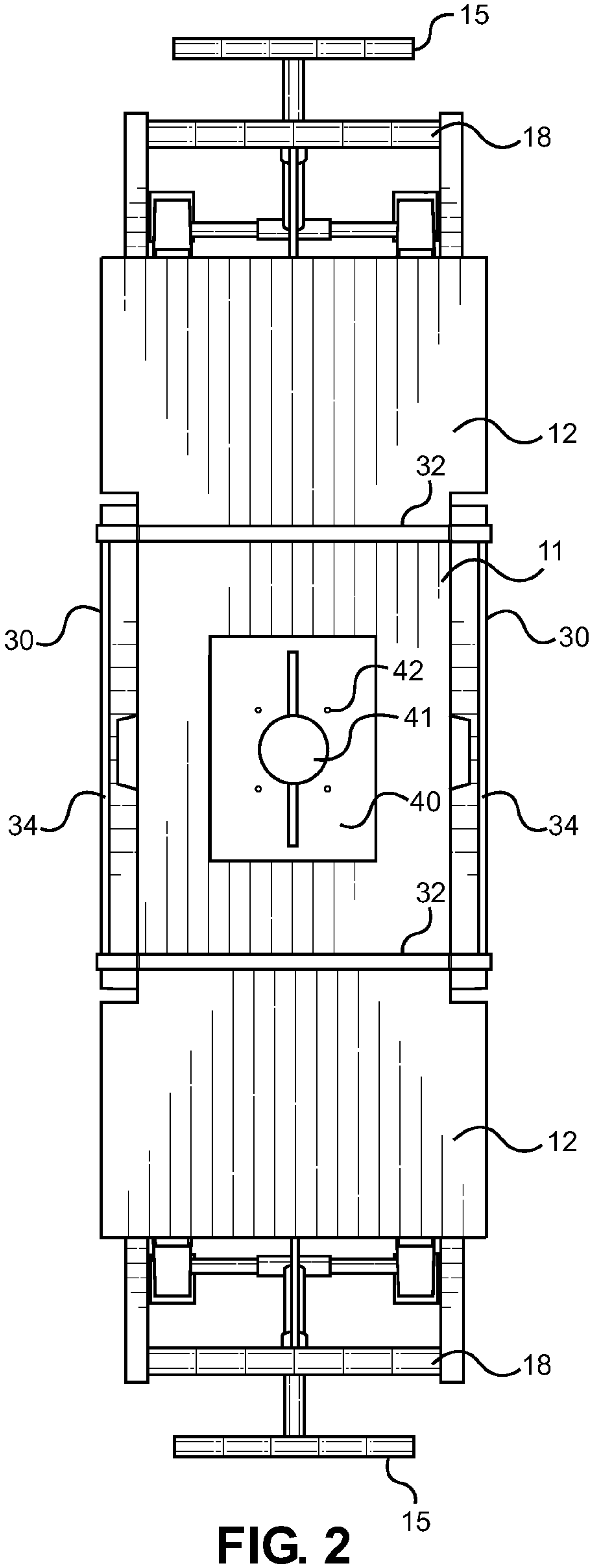
FIG. 2 shows an overhead view of the power tool workbench of the present invention.

Referring now to FIGS. 1 and 2, there is shown a perspective view and overhead view of the modular workbench of the present invention in a working position. The device comprises a collapsible workbench structure that can be deployed in a work area for a user to have a clean surface to work upon, while further the device employs a means for attaching a common power tool thereto to transform the assembly from a standard workbench to a cutting table or power tool bench. In this way, the user is provided a work surface or a tool table that eliminates the need for two dedicated assemblies for these functions.

The device comprises an elevated work area comprising a central surface 11 flanked by a first and second side surface 12 that establish a planar area and workbench surface upon which to handle work piece items during a project. The surfaces 11, 12 are supported by a largely rectangular workbench frame that spans the length of the assembly. Below the side surfaces 12 and connected to the workbench frame are collapsible workbench leg assemblies 13. These assemblies 13 elevate and support the workbench frame in a position for maximum user access, whereby the workbench work area is sufficiently accessible to a standing user.

Each of the leg assemblies 13 is pivotably attached to the workbench frame such that they can collapse thereagainst for more compact storage of the entire workbench assembly. When deployed, the leg assemblies 13 are locked into position for stability. When stowed against the workbench frame, a pair of roller wheels 17 along one of the leg assemblies 13 allows the user to roll the stowed assembly from one location to another for improved portability thereof. Finally, an operation pair of handle members 18 may be positioned outwardly from the side surface 12 for handling and lifting the assembly.

In a preferred embodiment, the leg assemblies 13 include a first and second upstanding leg member 14 having cross members 25 therebetween. Extending from the leg assemblies is a pivotable work piece outrigger 15. The outriggers 15 support elongated work pieces such that they do not sag or cause an upward pivot of the work piece based on the work piece length and its outward extension from the work area. The position of the outriggers 15 can be adjusted using an adjustable catch 16, which includes several catch locations therealong for securing the outrigger 15 to the leg assembly cross member 25. Multiple catch locations allow the outrigger 15 angle and thus the workbench outer support location to be adjustable for ever increasing work pieces without a secondary support.

The central surface 11 of the workbench comprises a hinged surface that is capable of pivoting upward along one end thereof from the workbench frame 33 to reveal to the user its underside surface. One end of the surface is hinged to the frame 33, while a pair of locking clamps situated along the underside of the frame secures the central surface 11 in a horizontal position while in use. The clamps may include a clamp arm that slides over the end of the central surface 11 to secure the same and prevent it from lifting when the clamps are engaged. This prevents the central surface 11 from rotating when applied thereover and when deployed in a working state.

Along the sides of the central surface 11 is a first and second extension arm member 30 that offers an outward extension from the table for supporting work pieces and for measuring exact cuts. The arm members 30 may include an upstanding flange 34 for abutting a work piece article thereagainst, allowing the user to slide the work piece therealong and ensure a uniform width cut, similar to what is found in conventional saw tables. The arm members 30 slide outward from an open channel 32, wherein an upper 31*a* and lower 31*a* arm is positioned therein and allows the extension arm member 30 to extend from and retract against the central surface 11. The channel 32 and thus the arms 30 may be attached to the frame 33 or alternatively be attached to the central surface 11 such that they life in conjunction therewith.

Along the central surface 11 is an enlarged aperture that reveals a power tool mounting plate 40 that is connected along the underside thereof. The mounting plate 40 is a largely rectangular frame that secures either a power router tool or to a power circular saw thereto, wherein the power tool is an otherwise independent assembly for cutting work pieces. The mounting plate 40 supports the tool in an inverted position such that its tool working end is positioned through an open aperture 42 therethrough and upwards through the central surface aperture. This effectively transforms the workbench into a cutting table, whereby an exposed circular saw or router blade is exposed for a user to cut work pieces therealong.

Further provided is a wiring assembly that accepts NC power via an extension cord 21 and routes it through an electrical fixture 65 mounted along the side of the workbench frame. The fixture 65 supplies electrical power to either the power router or circular saw attached to the workbench assembly, or further powers accessory items such as handheld power tools. The fixture 65 includes at least one electrical outlet and a power switch such that the user can connect the power tool to the power source and control electrical power thereto by way of a simple switch. The power is accepted from either a nearby outlet or from a generator on a work site, wherein the power is provided for the user in the customary fashion as found in most residences: an electrical outlet.

Figure 3:
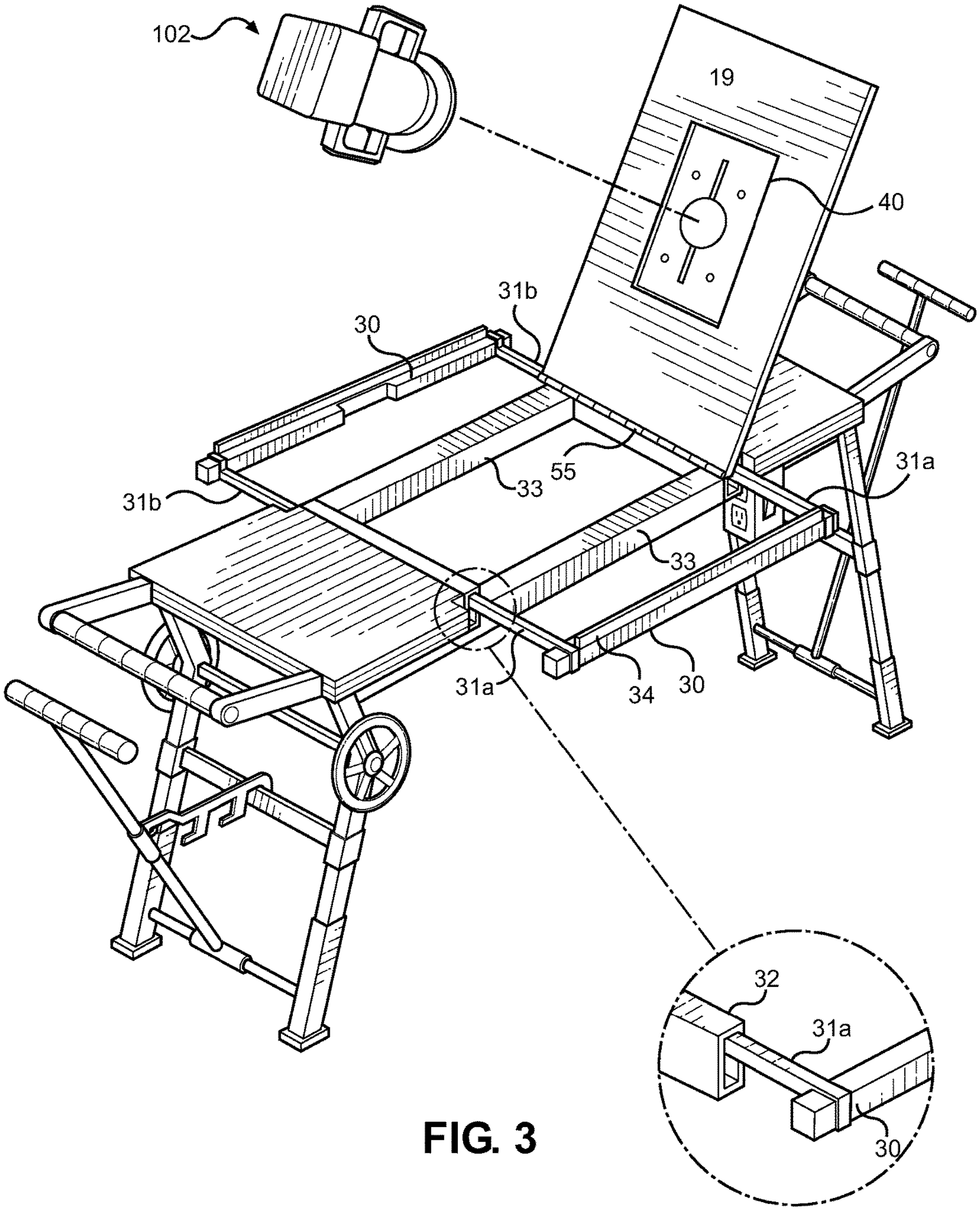
FIG. 3 shows a view of the present workbench central surface degree of freedom for attaching a power tool the underside thereof, transforming the workbench from a clean work surface to a cutting table.

Referring now to FIG. 3, there is shown a view of the central workbench surface 11 being rotated upwards to reveal its underside 19 and the connection between the router power tool 102 and the central surface mounting plate. The central surface 11 is hinged 55 along one end thereof, while its outer end 10 is adapted to align with the side surfaces and be secured by underside locking clamps (not shown). The extension arm members 30 slide along a defined slot, wherein one arm 31*a* slides over an opposing arm 31*b* to allow for collapsing into the arm channel 32 and further for allowing extension therefrom.

The central surface 11 rotates upward to reveal is underside surface 19 when attaching a power tool 102 thereto. This allows an operator to connect to a power tool 102 to the mounting plate 40, or to attach the power tool having the mounting plate 40 thereattached to the central surface. This allows an operator to easily replace an existing power tool thereattached, or to remove the power tool altogether. Most saw tables and power benches include a defined power tool assembly and further a motor that is not easily serviceable or replaceable. These tables can quickly become overused and their motors burned out. The present invention provides a bench that can accept different types of cutting power tools, while also allow for the power tool to be replaced if the motor thereof was to burn out prematurely or over time.

When the central surface is in an upward position, an electrical safety feature may deactivate the electrical fixture 31, thus ensuring that any power tool thereattached remains inactive when changing, attaching, or removing the same from the surface underside 19.

Figure 4:
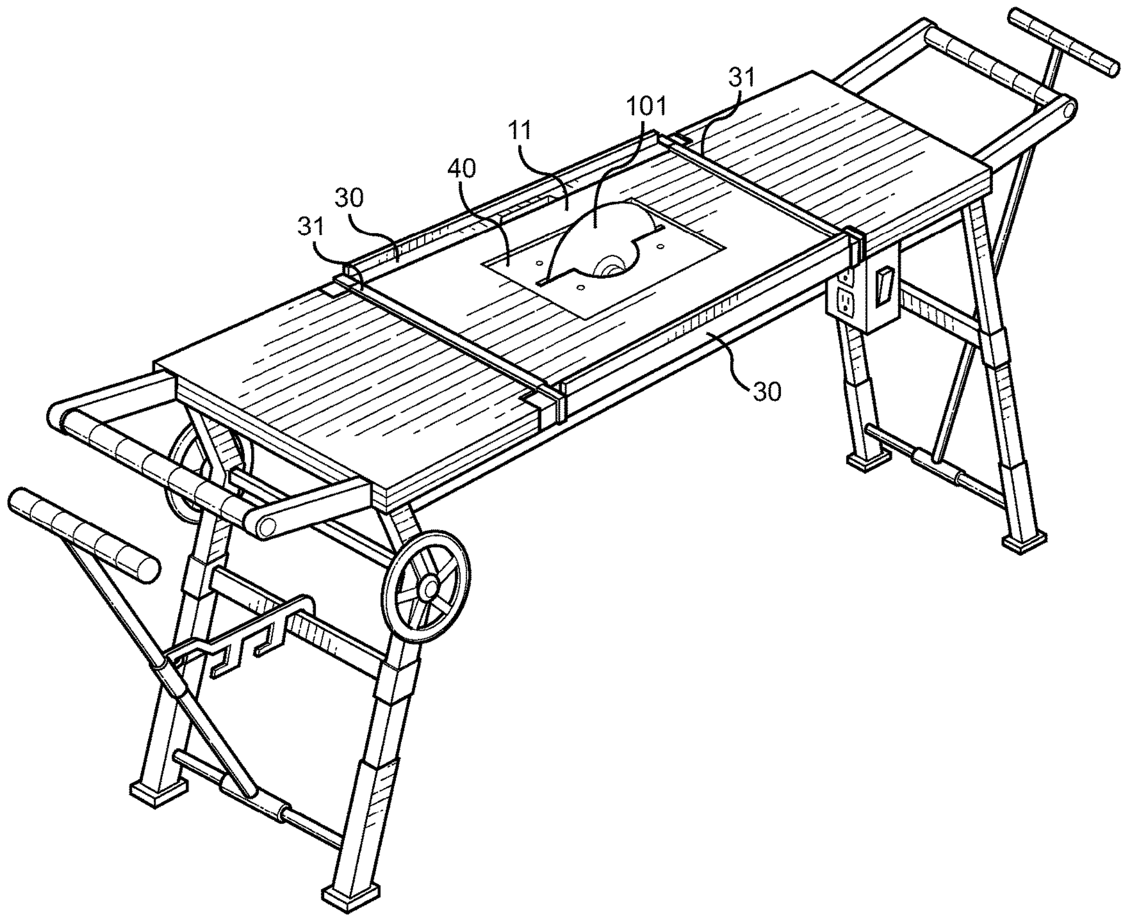
FIG. 4 shows a view of the workbench having a circular saw thereattached.

Referring now to FIG. 4, there is shown a view of the assembly being positioned such that a circular saw power tool 101 is in a working position with respect to the workbench. The saw 101 is secured to the central surface 11 mounting plate 40 such that its cutting blade is exposed through the surface 11 and upwards for use cutting work pieces positioned along the workbench. A further safety feature may include a contact switch between the power tool and the mounting plate 40, such that in the event of separation, the electrical power is ceased thereto to prevent injury. Yet another electrical safety switch may utilize electrical continuity across all fastener locations on the mounting plate, whereby a loose or removed fastener will break continuity and thus cease the operation of the power tool.

Figure 5:
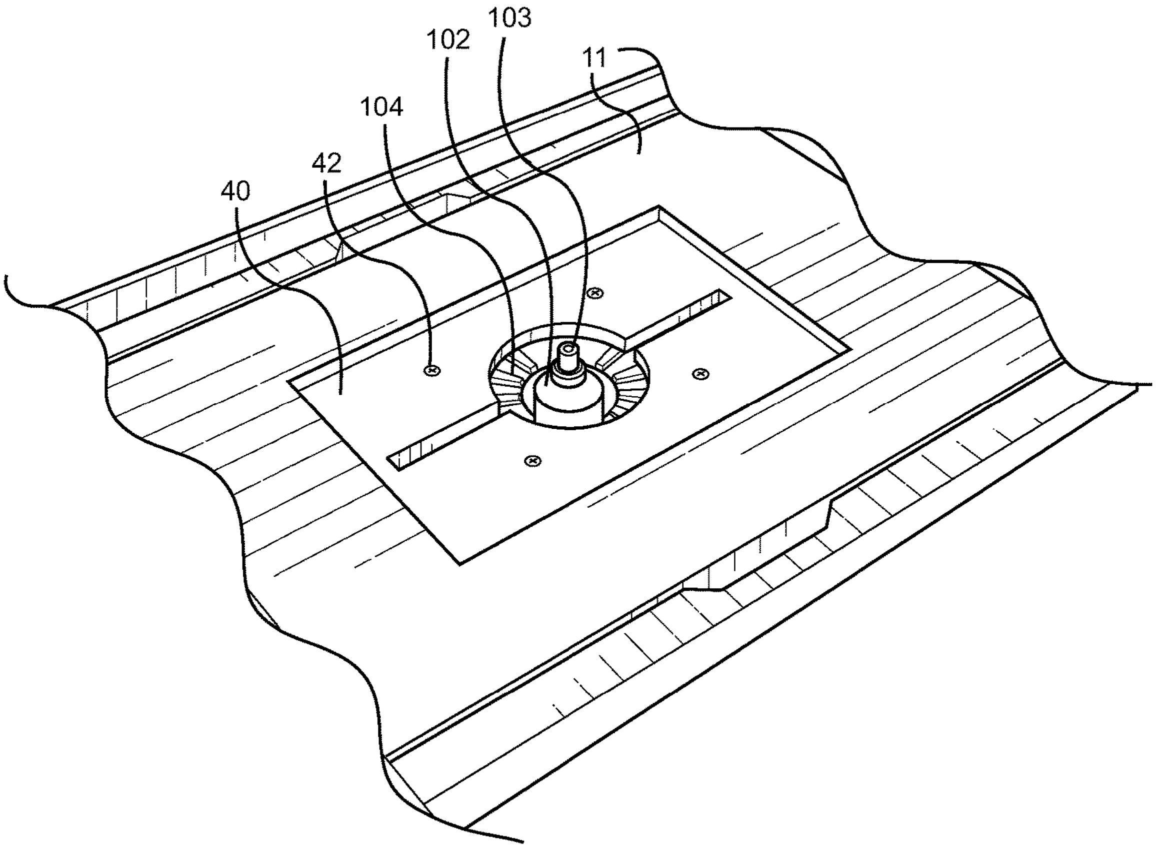
FIG. 5 shows a view of the workbench having a router thereattached and in a working position being supported by the central workbench surface.

Referring now to FIG. 5, there is shown an overhead view of the assembly in connection with a router power tool 102. It is contemplated that either a router power tool or circular saw can be connected to the mounting plate 40, whereby its tool working end 103 is positioned through the mounting plate aperture such that it can contact a work piece sliding along the central surface 11. The preferred connection between a router power tool and the mounting plate 40 is a fastened connection, whereby a plurality of mechanical fasteners secures through fastener holes 42 in the mounting plate 40 and through the router base 102. Different fastener hole patterns may be deployed to accommodate different size and different brand router tools.

Figure 6:
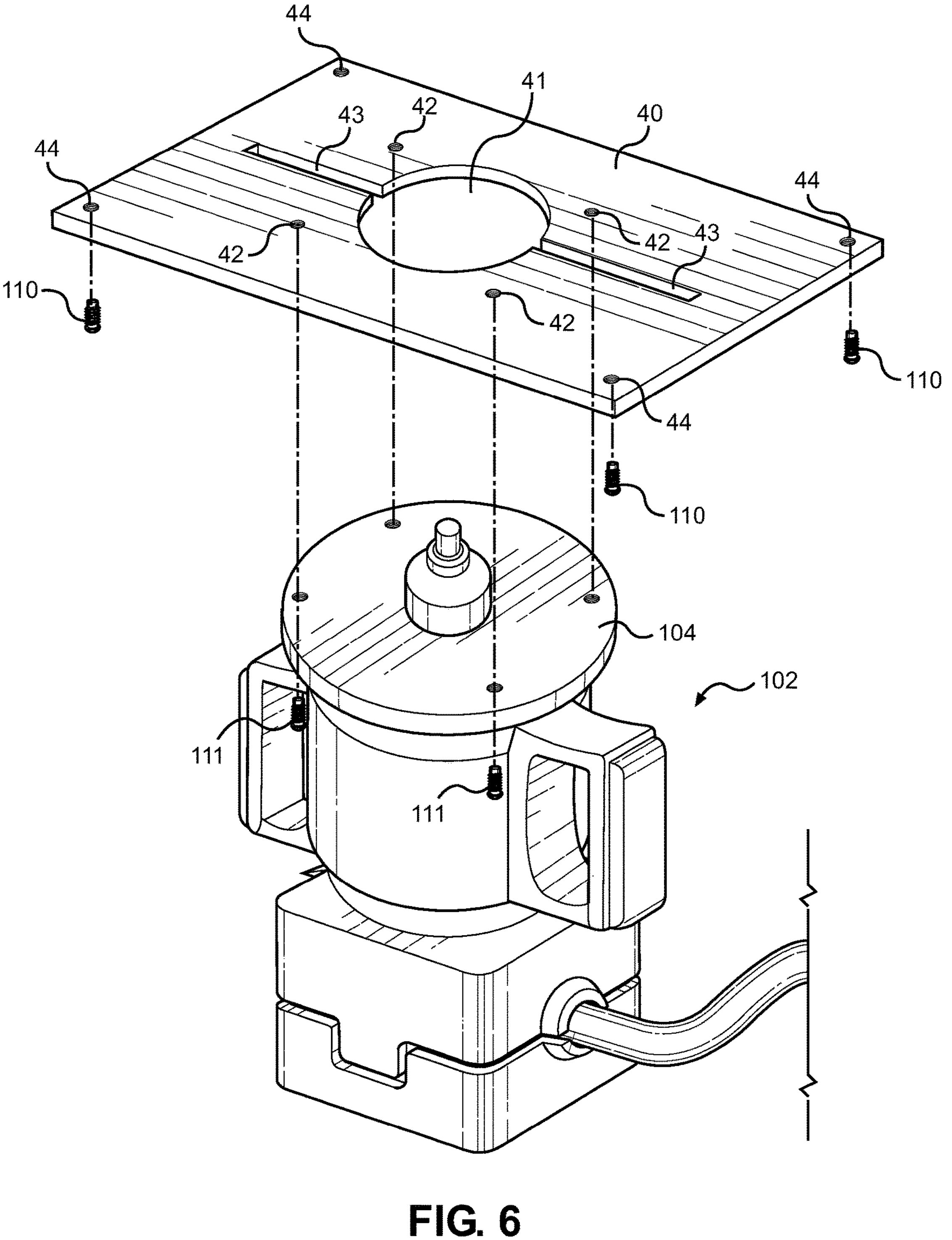
FIG. 6 shows a view of the central surface mounting plate to a router power tool.

Referring finally to FIG. 6, there is shown a view of a router power tool connection to the workbench assembly mounting plate 40. In a preferred embodiment, the connection between the mounting plate 40 and the central surface is mechanical fastening, wherein fasteners 110 are threaded through apertures 44 in the mounting plate 40 perimeter to secure the plate thereto. Similarly, the router power tool 102 is fastened to the mounting plate using mechanical fasteners 111 through its base 104 using threaded apertures 42 along the interior of the plate 40. In this way, the plate 40 can be removed and connected to the power tool, whereafter the connected assembly can be secured to the underside of the central surface.

Router power tools include a flat base 104 that abuts against a work piece as the tool cutting implement cuts through the thickness of the work piece. The base 104 of a router is utilized to secure the tool to the mounting plate 40, wherein the securing fasteners 111 are fed through apertures in the base 104 to secure the tool to the plate 40. As previously noted, several safety features are contemplated, including a pressure switch between the plate 40 and the central surface, or electrical continuity running through the fastener apertures 42 within the plate 40 to ensure secure connection of the fasteners 111 therein during operation of the tool.

Figure 7:
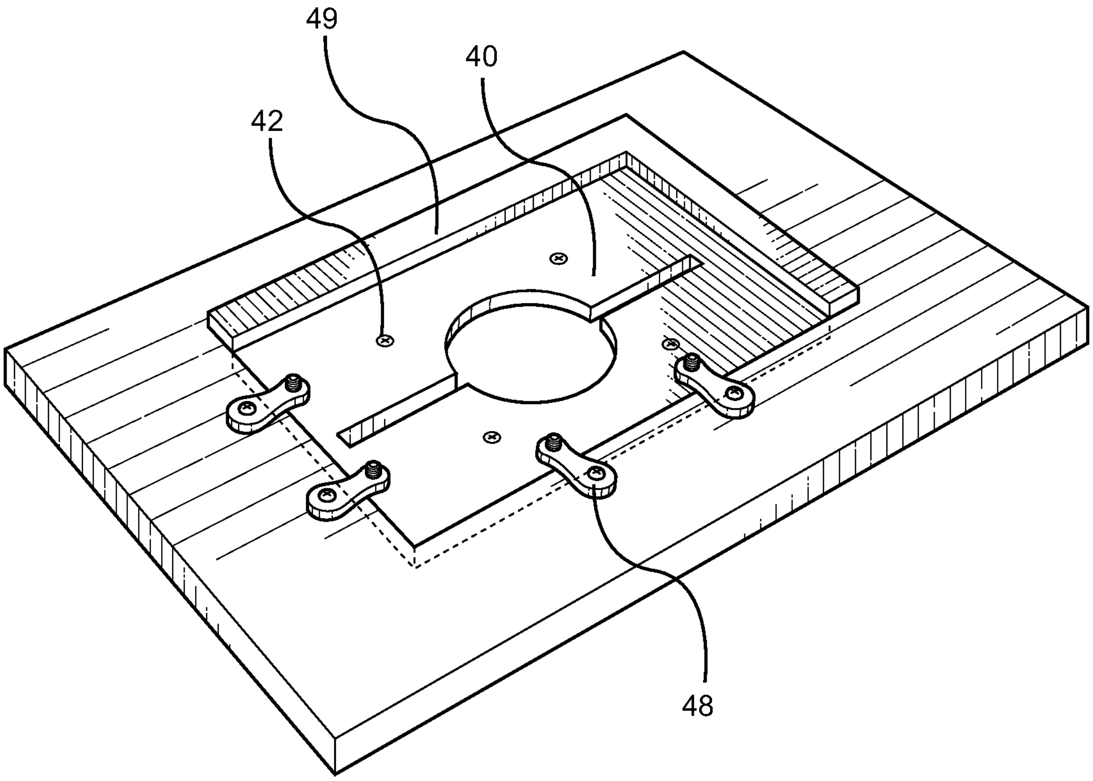
FIG. 7 shows an exemplary embodiment of the mounting plate, wherein either a router tool or circular saw is accommodated.

Referring now to FIG. 7, there is shown an exemplary embodiment of the mounting plate 40, wherein the plate 40 provide connection means for both a router tool base and a circular saw shoe. The mounting plate 40 includes four sides and a substantially rectangular shape. Two adjoining sides include a recessed channel 49 within which to accept the relatively flat and thin structure of a circular saw shoe. Once secured therein, cam locks or rotatable clamps 48 can be rotated over the free end of the circular saw shoe to secure the same against the plate 40. The clamps include a threaded bolt that can be extended against the saw shoe, clamping it down against the mounting plate for safe operation while the saw blade passes through the plate blade aperture. This same plate can include fastener locations and an open portion of the blade aperture to accept and secure a power routing tool thereagainst. Thus, this embodiment of the plate is adapted for use with either a circular saw or router power tool.

When working with various saws and routers, workers need a substantial workbench to set up, prep, and to work with certain work pieces. Many shops and work areas, however, may not have enough room for people to set up multiple work areas. Users therefore attempt to fit all of the required saws and routers in one small work area, but working in cluttered or confined spaces can cause users to make inaccurate cuts or injure themselves in confined areas. This can waste lumber, which can be expensive, and can lead to workplace injuries.

To preserve space and to improve efficiency when working with multiple tools, the present invention provides a workbench and convertible saw table. The device comprises a workbench that provides users with a work area that can accommodate three functions in one assembly. The workbench can be utilized as a clean and elevated work surface, or alternatively the assembly can be converted into a circular saw or router saw table. The power tool of choice is secured to the central surface of the workbench along its underside, which is a hinged section that provides ready underside access. A pair of pull out, sliding clamps secure the central surface while in operation, while a mounting plate is provided to secure the power tool in a working position against the underside of the central surface. By deploying this assembly, a user can have the flexibility of using three different tools on one workspace, without having to spread out on three different tables. Contractors, construction workers, and at-home do-it-yourselfers can all benefit from the use of this assembly.

An alternate embodiment of the workbench assembly contemplates a single, hingable work surface that is supported by the workbench frame and leg assemblies. In this embodiment, the surface is not flanked by side surfaces, but rather a single surface is provided that can rotate upwards or be secured horizontally. This embodiment simplifies the assembly and reduces the number of segmented surfaces. Further embodiments contemplate more surfaces. It is desired to disclose a workbench assembly and tool support that has at least one workbench surface, whereby that surface can be singularly supported by the workbench frame or supported with a plurality of other, adjacent surfaces for a greater workspace.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A workbench and power tool support assembly, comprising:
- a workbench frame supporting at least one workbench surface;
- a pair of workbench leg assemblies supporting said workbench frame in an elevated position;
- at least one workbench surfaces being hingedly supported by said workbench frame to reveal said workbench surface underside;
- said hinged workbench surface having an aperture therethrough;
- a power tool mounting plate having a power tool working end aperture over said hinged workbench surface aperture;
- said power tool mounting plate adapted to removably secure a power tool thereto, whereby said power tool working end is adapted to extend through said power tool working end aperture of said mounting plate and through said aperture of said workbench surface;
- an electrical fixture adapted to receiving power via an extension cord, wherein said electrical fixture is adapted to provide power to said power tool mounted to said power tool mounting plate;
- one or more slidable extension arm members having arms that extends from channels along said workbench frame, said arms adapted for supporting large work pieces;
- one or more deployable work piece outriggers pivotably connected to said leg assemblies, said outriggers adapted to support work pieces extending outward from said at least one workbench surface;
- said power tool mounting plate comprises a planar support that is fastened to said at least one workbench surface;
- said planar support having four sides and a substantially rectangular shape;
- two adjoining sides of said mounting plate having a channel recess extending along both of said two adjacent sides adapted to accept a circular saw shoe therein;
- two sides opposite said channel recess, each of said two sides comprising at least one clamp member, said clamp members adapted to secure said circular saw against said mounting plate.

2. The device of claim 1, wherein said at least one workbench surface further comprises a hinged, central surface and a first and second side surfaces flanking said central surface.

3. The device of claim 1, wherein said workbench frame is a largely rectangular structure supporting said at least one workbench surface therebelow.

4. The device of claim 1, wherein said leg assemblies are hinged to said workbench frame such that said leg assemblies are collapsible thereagainst.

5. The device of claim 1, wherein said electrical fixture further comprising at least one electrical outlet and a power switch.

6. The device of claim 1, wherein said power tool mounting plate further comprises:
- a largely planar support that is fastened to said at least one workbench surface below said aperture through said workbench surface;

said planar support having fastener locations for fastening the base of a power tool thereto in an inverted orientation.

7. The device of claim 6, wherein said power tool mounting plate is adapted to secure to a power router base.

8. The device of claim 1, further comprising fastener locations for fastening the base of a power tool thereto in an inverted orientation.

9. The device of claim 1, further comprising a pair of handles extending from said workbench frame.

10. The device of claim 1, further comprising a pair of roller wheels rotatably attached to at least one of said leg assemblies.

11. A workbench and power tool support assembly, comprising:

a workbench frame supporting at least one workbench surface;

a pair of workbench leg assemblies supporting said workbench frame in an elevated position;

at least one workbench surfaces being hingedly supported by said workbench frame to reveal said workbench surface underside;

said hinged workbench surface having an aperture therethrough;

a power tool mounting plate having a power tool working end aperture over said hinged workbench surface aperture;

said power tool mounting plate adapted to removably secure a power tool thereto, whereby said power tool working end is adapted to extend through said power tool working end aperture of said mounting plate and through said aperture of said workbench surface;

an electrical fixture adapted to receiving power via an extension cord, wherein said electrical fixture is adapted to provide power to said power tool mounted to said power tool mounting plate;

said power tool mounting plate comprises a planar support that is fastened to said at least one workbench surface;

said planar support having four sides and a substantially rectangular shape;

two adjoining sides of said mounting plate having a channel recess extending along both of said two adjacent sides adapted to accept a circular saw shoe therein;

two sides opposite said channel recess, each of said two sides comprising at least one clamp member, said clamp members adapted to secure said circular saw against said mounting plate.

* * * * *